United States Patent
Day

(10) Patent No.: US 9,103,992 B1
(45) Date of Patent: Aug. 11, 2015

(54) FLEXIBLE BANDWIDTH WAVELENGTH SELECTIVE SWITCH

(71) Applicant: Capella Photonics, Inc., San Jose, CA (US)

(72) Inventor: Daniel P. Day, Scotts Valley, CA (US)

(73) Assignee: Capella Photonics, Inc., San Jose, CA (US)

( * ) Notice: Subject to any disclaimer, the term of this patent is extended or adjusted under 35 U.S.C. 154(b) by 201 days.

(21) Appl. No.: 13/666,902

(22) Filed: Nov. 1, 2012

(51) Int. Cl.
| | |
|---|---|
| *G02B 6/35* | (2006.01) |
| *G02B 6/26* | (2006.01) |
| *G02B 5/18* | (2006.01) |
| *G02F 1/13* | (2006.01) |
| *G01J 3/51* | (2006.01) |

(52) U.S. Cl.
CPC .................................... *G02B 6/3534* (2013.01)

(58) Field of Classification Search
USPC ........ 385/14–16, 147, 11, 18, 10, 37; 349/17, 349/18, 41, 57, 62; 356/416; 359/464, 465, 359/15, 23, 569, 566
See application file for complete search history.

(56) References Cited

U.S. PATENT DOCUMENTS

| | | | | |
|---|---|---|---|---|
| 6,353,489 | B1* | 3/2002 | Popovich et al. | 359/15 |
| 7,058,252 | B2* | 6/2006 | Woodgate et al. | 385/16 |
| 7,257,288 | B1* | 8/2007 | Strasser et al. | 385/24 |
| 7,822,303 | B2* | 10/2010 | Cohen et al. | 385/18 |
| 8,565,560 | B2* | 10/2013 | Popovich et al. | 385/10 |
| 2007/0002447 | A1* | 1/2007 | Kawasaki et al. | 359/569 |
| 2007/0182915 | A1* | 8/2007 | Osawa et al. | 349/201 |
| 2008/0055551 | A1* | 3/2008 | Endo et al. | 353/20 |

\* cited by examiner

*Primary Examiner* — Akm Enayet Ullah

(74) *Attorney, Agent, or Firm* — Joshua D. Isenberg; JDI Patent

(57) ABSTRACT

A method and an apparatus for switching a beam from a first port to a second port in an optical switch are described. Switching is performed by a single-axis beam steering element and one or more actuatable beam diffraction devices. Each beam diffraction device is actuatable between diffracting and non-diffracting states. Each beam diffraction device is configured to deflect the optical beam when in the diffracting state such that at least part of the optical beam is diffracted outside a detection area of a column of I/O ports. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

26 Claims, 8 Drawing Sheets

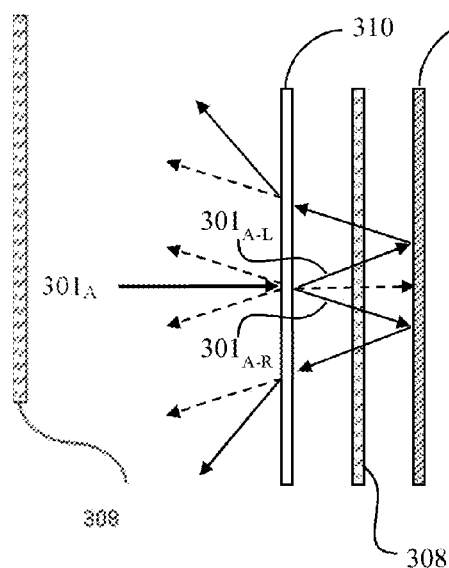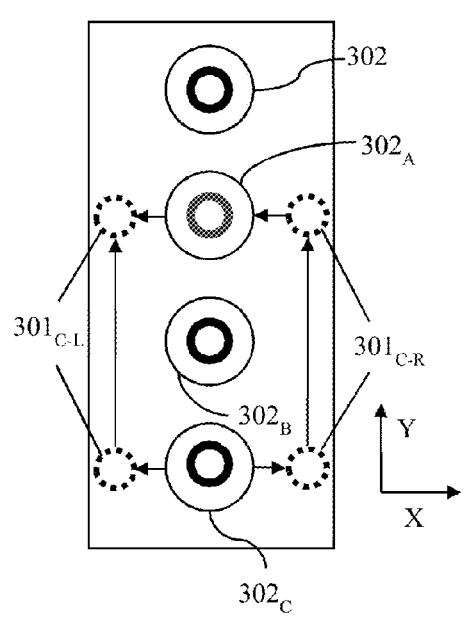
FIG. 3C  FIG. 3D
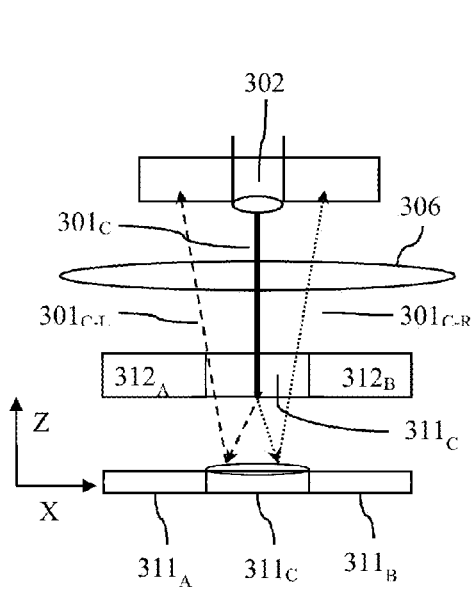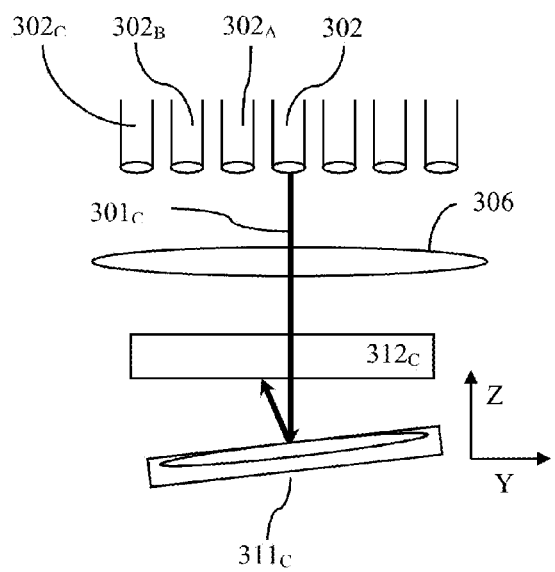
FIG. 3E  FIG. 3F

FLEXIBLE BANDWIDTH WAVELENGTH SELECTIVE SWITCH

BACKGROUND

With the substantial growth in demand for internet bandwidth, internet traffic requirements have become quite unpredictable. In adapting to this challenge, many networks have evolved to use reconfigurable optical add/drop modules (ROADM) at nodes in ring or mesh networks. FIG. 1 is a schematic diagram illustrating a network 100 that utilizes a ROADM. As shown, traffic from Node A to Node B may be routed dynamically through the use of such a ROADM 101. A new channel may be deployed by the ROADM 101 in response to an increased bandwidth requirement. Likewise, an existing channel may be dropped by the ROADM 101 in response to any congestion/disruption occurring within the network. To better enable routing flexibility, the system may employ many usable wavelengths or channels. Optical signals may be divided amongst different channels characterized by different wavelengths (or different wavelength ranges). Different signal channels may be multiplexed together into one node, transmitted over a fiber as a wavelength multiplexed signal to another node, where the multiplexed signal can be de-multiplexed so that individual signal channels can be optically routed to different destinations, e.g., over different fibers.

A ROADM typically uses some form of wavelength selective optical switch to selectively route different channels in a wavelength multiplexed optical signal among different optical paths. A typical configuration for a wavelength selective switch (WSS) 200 is shown in FIG. 2A. Optical signals can enter and exit the WSS 200 via optical input/output (I/O) ports 202, $202_A$, $202_B$, $202_C$. The optical I/O ports may be configured to optically couple signals to or from corresponding optical fibers (not shown). In the example shown in FIG. 2A, a wavelength multiplexed signal 201 enters the WSS 200 via port 202. The multiplexed signal 201 is optically coupled to a wavelength separator 204, such as a diffraction grating, which separates the signal 201 into its component spectral channels $201_A$, 201B, $201_C$ according to their respective wavelengths (or wavelength ranges). Relay optics 206 couple the spectral channels $201_A$, 201B, $201_C$ to a switching component 208 having an array of beam steering elements $208_A$, $208_B$, $208_C$. The wavelength separator 204, relay optics 206 and switching component 208 are configured so that each of the spectral channels $201_A$, 201B, $201_C$ is consistently coupled to a corresponding beam steering element $208_A$, $208_B$, $208_C$.

The beam steering elements couple the spectral channels back through the relay optics 206 to the wavelength separator 208. Due to the reversible nature of optics, the spectral channels are coupled back to the ports. However, by appropriately deflecting the spectral channels, the beam steering elements can selectively direct a spectral channel to exit the WSS 200 via any of the I/O ports.

The beam steering elements may be in the form of rotatable mirrors, e.g., microelectromechanical systems (MEMS) mirrors. In many commonly available WSS devices, the MEMS mirrors are configured to rotate about two different axes. In the example shown in FIG. 2A, each mirror can rotate about a horizontal switching axis X and a vertical attenuation axis Y. Rotation of a mirror about its switching allows a spectral channel to be selectively coupled between the mirror and a particular one of the ports 202, $202_A$, $202_B$, $202_C$. Rotation of a mirror about its attenuation axis adjusts the alignment of the spectral beam relative to an axis of the port to which it is coupled after it is reflected by the mirror. Another reason to use dual axis mirrors is depicted in FIG. 2B. Suppose the switch 200 is originally configured to receive the multiplexed signal 201 at port 202 and couple spectral channel $201_C$ to port $202_C$, while the other channels are coupled to port $202_B$. Later it is desired to couple channel $201_C$ to port $202_A$. This could be done by rotating mirror $208_C$ about its switching axis. However, if this were to be done channel $201_C$ would be briefly coupled to port $202_B$. To avoid this, mirror $208_C$ can be rotated about its attenuation axis so that channel $201_C$ avoids port $202_B$ during switching as shown by the path indicated by the arrows in FIG. 2B. This type of switching is sometimes called "hitless" switching.

Although there are advantages to the use of dual axis mirrors as beam steering elements, dual axis mirrors require a certain amount of space between adjacent mirrors and this places limits on the practical size and number of mirrors that can be used in a switch.

One attempt to avoid the problems associated with MEMS mirrors is to use polarization sensitive beam steering elements in a wavelength selective switch. An example of such a wavelength selective switch is described in U.S. Pat. No. 7,468,840 to Cohen et al., issued Dec. 23, 2008. In this type of switch an input optical signal is wavelength-dispersed and polarization-split in two angularly oriented planes. A pixelated polarization rotation device operates on each separate wavelength channel to rotate the polarization of the light signal passing through the pixel, according to a control voltage applied to that pixel. The polarization modulated signals are then wavelength-recombined and polarization-recombined by similar dispersion and polarization combining components as were used to disperse and split the input signals. The direction of the output signal is determined by whether the polarization of a particular wavelength channel was rotated by the polarization modulator pixel, or not.

A wavelength selective switch that uses such polarization sensitive beam steering elements requires parallel optical paths for the different polarization components as well as splitters, combiners and polarization rotators. These can add to the complexity and cost of a wavelength selective switch.

It is within this context that aspects of the present disclosure arise.

BRIEF DESCRIPTION OF THE DRAWINGS

FIG. 3C is a schematic of the optical path of a beam being deflected by an actuatable beam diffraction device.

FIGS. 3D-3F depict the switching process according to an aspect of the present disclosure.

DESCRIPTION OF THE SPECIFIC EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
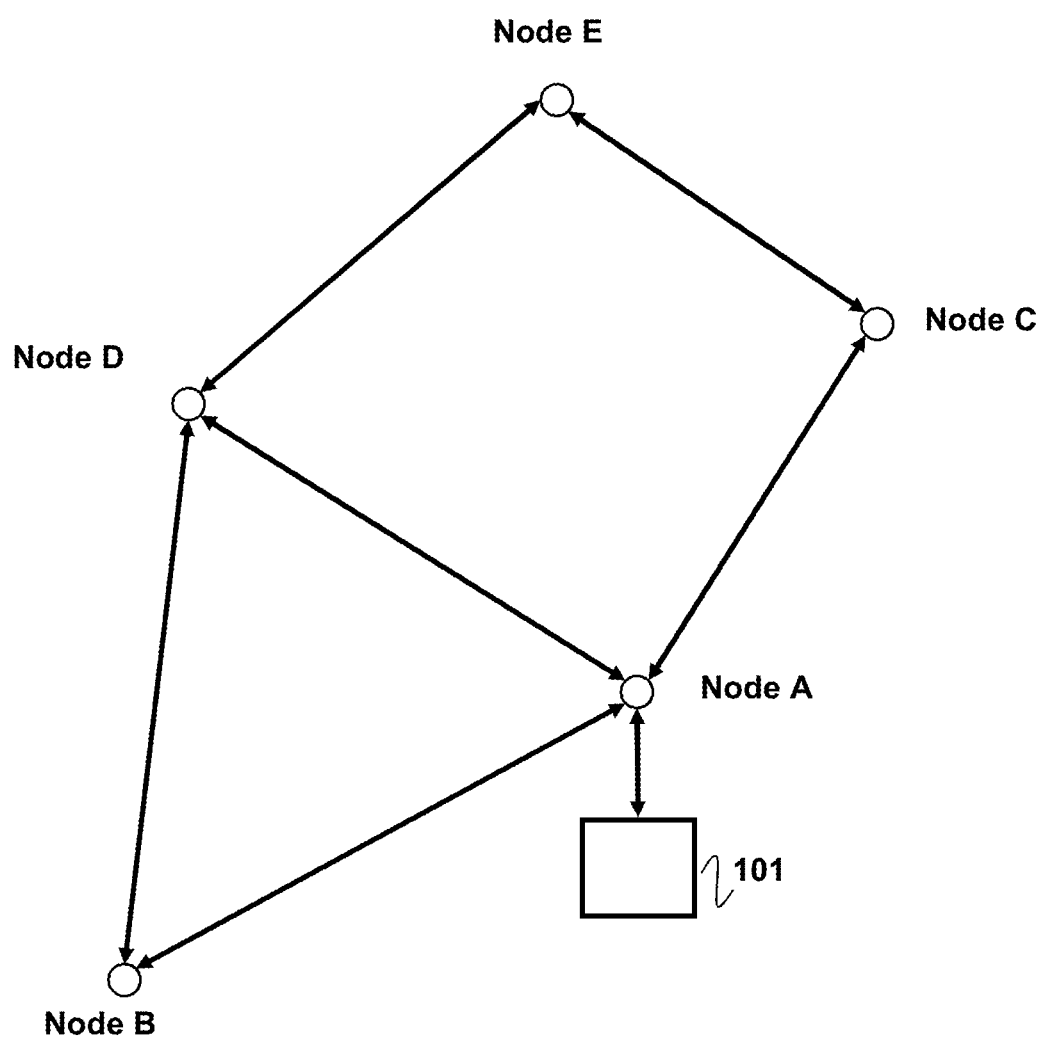
FIG. 1 is a schematic diagram illustrating an optical network that utilizes a reconfigurable optical add/drop module (ROADM)
Figure 2A:
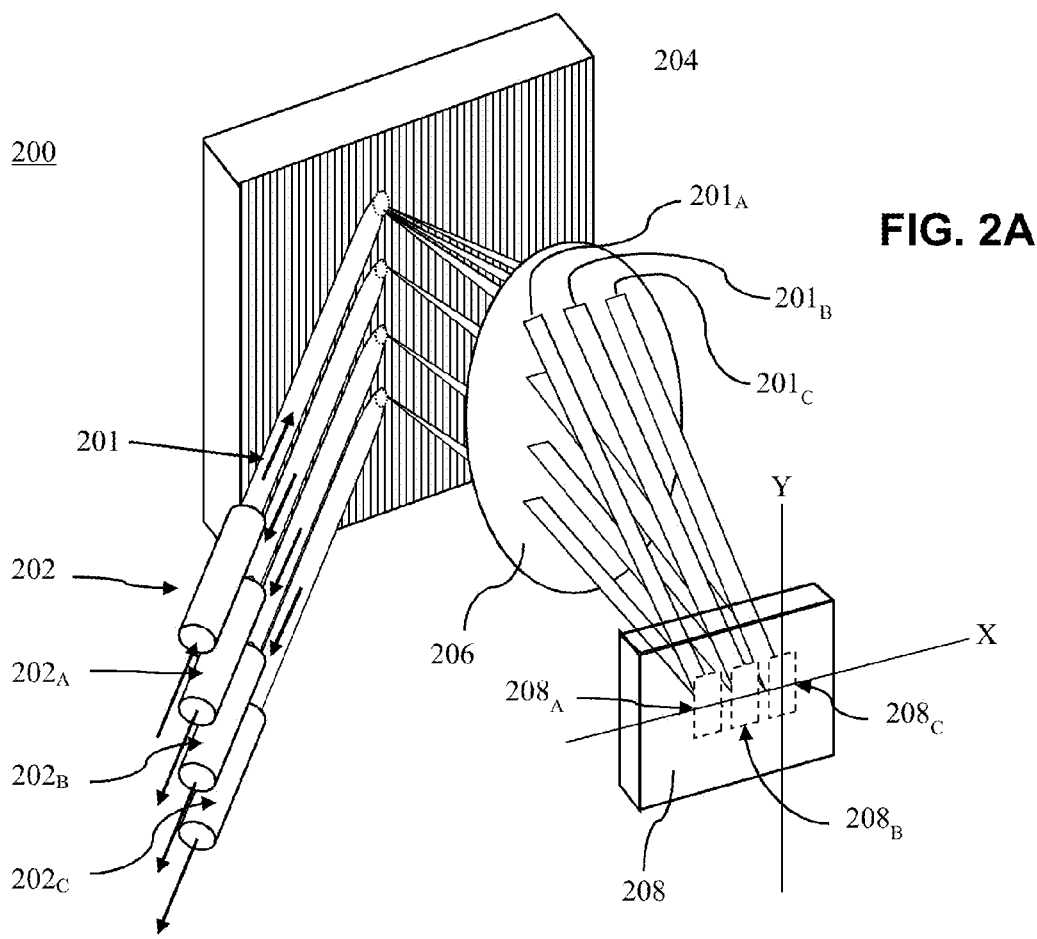
FIG. 2A is a schematic diagram illustrating an example of a wavelength switch system (WSS).
Figure 2B:
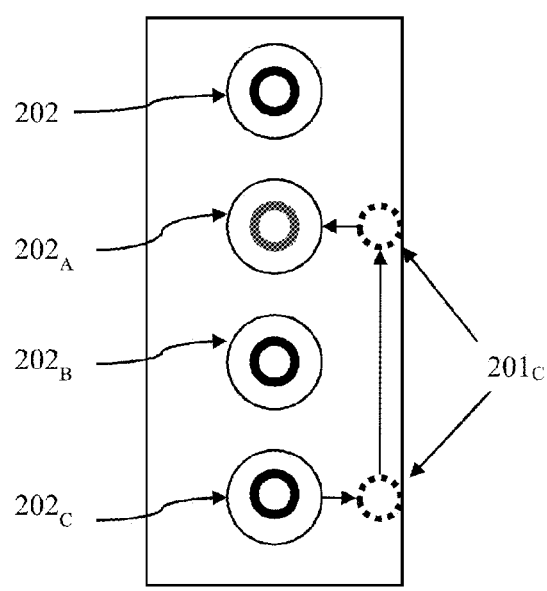
FIG. 2B is a diagram of how a prior art WSS switches an optical channel.
Figure 3A:
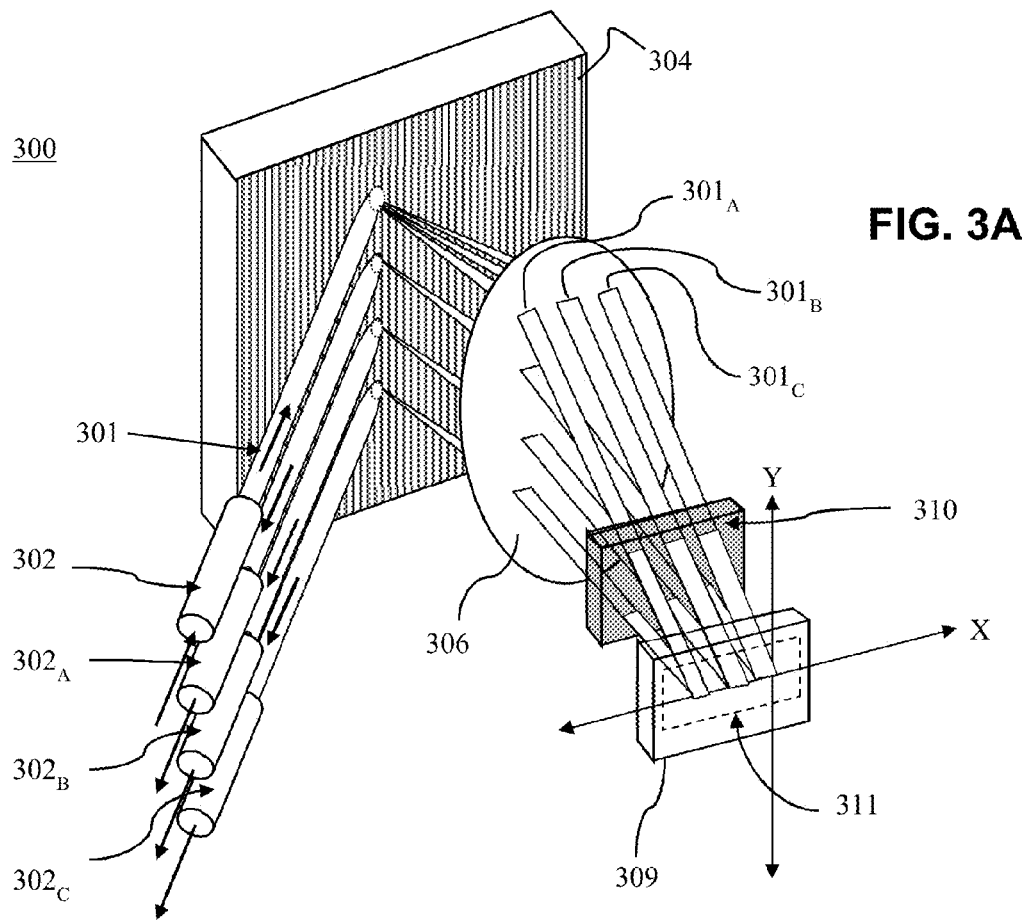
FIG. 3A is a schematic diagram of an optical switch according to an aspect of the present disclosure.

Aspects of the present disclosure describe a method and an apparatus for switching a beam from a first port to a second port in an optical switch. The switching is performed by a beam steering element and one or more actuatable beam diffraction devices. The beam steering element may be comprised of an array of beam steering cells which are capable of rotation about a single axis. This steering element is responsible for the switching or routing the spectral channels. By way of example and not by way of limitation the beam steering cells may be microelectromechanical systems (MEMS) mirrors. The one or more actuatable beam diffraction devices may be in the form of an array of polarization independent attenuation cells. Each of the one or more actuatable beam diffraction devices is actuatable between a non-diffracting state and a diffracting state. Each of the one or more actuatable beam diffraction devices is configured to deflect the optical beam when in the diffracting state such that at least a portion of the optical beam is diffracted outside a detection area of the column of I/O ports. By way of example and not by way of limitation, the attenuation cells may bean array of liquid crystal polarization gratings (LCPG). FIG. 3A is a depiction of a WSS device 300 according to this embodiment.

By way of example and not by way of limitation, optical signals can enter and exit the WSS 300 via input/output (I/O) ports 302, $302_A$, $302_B$, $302_C$. Four I/O ports are included in order to maintain clarity in the drawing, but it should be clear to one of ordinary skill in the art that additional I/O ports may be added to the WSS 300 as necessary. The optical I/O ports may be configured to optically couple signals to or from corresponding optical fibers (not shown). By way of example, and not by way of limitation, each of the I/O ports 302, $302_A$, $302_B$, $302_C$ may include an optical component, e.g., a lens, such as a gradient index (GRIN) lens that is configured to convert an optical signal carried by an optical fiber to a corresponding collimated free-space optical beam or vice versa.

In the example shown in FIG. 3A, a wavelength multiplexed signal 301 enters the WSS 300 via port 302. The multiplexed signal 301 is optically coupled to a wavelength separator 304, such as a diffraction grating, which separates the signal 301 into its component spectral channels $301_A$, 301B, $301_C$ according to their respective wavelengths (or wavelength ranges). Three spectral channels are included in order to maintain clarity in the drawing, but it should be clear to one of ordinary skill in the art that additional spectral channels may be added to the WSS 300 as necessary. Relay optics 306 couple the spectral channels $301_A$, 301B, $301_C$ to the beam steering element 309. The wavelength separator 304 and relay optics 306 are configured so that each of the spectral channels $301_A$, 301B, $301_C$ is consistently coupled to a portion of the beam steering element 309. Spectral channels $301_A$, $301_B$, $301_C$ may also pass through the actuatable beam diffraction device 310 prior to reaching the primary beam steering element 309. Spectral channels $301_A$, $301_B$, $301_C$ may also pass through the actuatable beam diffraction device 310 after leaving the primary beam steering element 309.

Figure 3B:
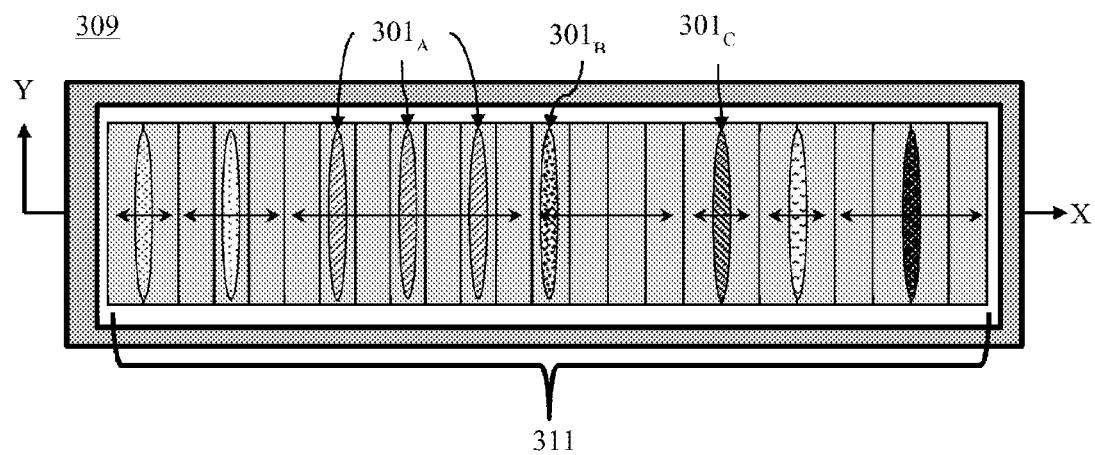
FIG. 3B is an enlarged view of the beam steering cells according to an aspect of the present disclosure.

The beam steering element 309 is enlarged in FIG. 3B in order to show an array of beam steering cells 311 that may be present according to certain aspects of the present disclosure. By way of example and not by way of limitation, the beam steering cells 311 may be in the form of rotatable mirrors, e.g., MEMS mirrors. By way of example and not by way of limitation, the beam steering cells 311 may alternatively be implemented using an electro-optical beam deflection device that uses a slab of nonlinear electro-optic material. An electric field applied across the slab perpendicular to the beam direction in the slab controls deflection of the beam. The slab of electro-optical material may be made of lead lanthanum zirconate titanate (PLZT) and the electric field may be applied by applying a voltage between electrodes formed on opposite faces of the slab. In such an implementation the gaps between adjacent beam steering cells 311 may be completely eliminated.

Each beam steering cell 311 may be configured to independently deflect a corresponding spectral beam about a single axis of rotation. In the example depicted in FIG. 3B, the axis of rotation is the X-axis. Deflection of the spectral beams about the X-axis allows a spectral channel $301_A$, $301_B$, or $301_C$ to be selectively coupled between the mirror and a particular one of the output ports $302_A$, $302_B$, $302_C$. Limiting the beam deflection by the beam steering cells 311 to a single axis allows for the spacing between each beam steering cell to be decreased, e.g., where the beam steering cells use MEMS mirrors to deflect the spectral beams.

In FIG. 3B, the elliptical shape for the channels $301_A$, $301_B$, $301_C$ shows the beam spot of the center wavelength of a channel. In FIG. 3B, the three elliptical beams for channel $301_A$ represent three wavelength components of the input spectrum of the channel 301A, corresponding to shortest, center and longest wavelengths. Since the input channels $301_A$, $301_B$, $301_C$ have variable spectral width, their coverage at the beam steering cells 311 vary accordingly. The horizontal arrows associated with each channel indicate the spread of the wavelengths of that channel. The beam shape is nearly identical for each wavelength, determined by the system optics. The spread of the wavelengths for a given input channel determined the coverage of the micromirrors. When several adjacent micromirrors are directed to the same output port, except the attenuation caused by the gaps between micromirrors, it appears there is "one" large micromirror directing the optical signal associated with these wavelengths to one specific output port. The number of the micromirrors determines the spectrum width corresponds to this "large" micromirror. Dynamically allocating a group of micromirrors for any input channel provides the flexible channel spectrum width. Dynamically changing the spread of wavelengths with a channel is a matter of selecting the mirrors that correspond to the desired wavelength range and moving those mirrors together. If the gaps between mirrors can be made sufficiently small, the effect of the gap can be smaller than the ripple requirement of the system.

The effect of the gap is determined by the beam shape which is designed by the optics. By way of example, and not by way of limitation, a typical Gaussian beam width in the X-direction is about 15 microns (μm). To get the loss due to the gap to be less than the ripple spec of ~0.3 dB, the gap should be less than 3 μm. This is different from the prior art because a spacing of approximately 6 μm is required between mirrors designed to rotate about two axes. The minimum gap may be determined by the thickness of the mirror and the amount of rotation needed. There are many other design constraints.

The narrow spacing between the beam steering cells 311 allows for the wavelengths for a spectral channel 301$_A$, 301$_B$, or 301$_C$ to cross over the gaps between beam steering cells 311 with only an insignificant increase in insertion loss due to the gap. Therefore, this embodiment of the present invention allows for a group of two or more adjacent cells 311 to be uniformly controlled in order to steer a spectral channel 301$_A$, 301$_B$, or 301$_C$ that has a bandwidth larger than any individual beam steering cell 311. By way of example and not by way of limitation, each of the beam steering cells 311 may be sized to correspond to 25 GHz of the optical spectrum. For example, if the beam steering cells 311 use MEMS mirrors for each spectral channel, each MEMS mirror may be approximately 50 μm wide by 700 μm in height. A group of two or more adjacent of the 25 GHz wide MEMS mirrors may function as a single beam steering cell 311 and enable the WSS 300 to control (switch or route) spectral channels 301$_A$, 301$_B$, or 301$_C$ of any size in increments of 25 GHz. Dynamically grouping beam steering cells 311 enables the WSS 300 to dynamically define the bandwidth of a spectral channel 301$_A$, 301$_B$, or 301$_C$. This feature is not possible with beam steering cells that require rotation about two axes. Spacing between the mirrors large enough to allow for rotation creates too much insertion loss. This limits the spectral channel to a single mirror. Without the ability to allow a spectral channel to span multiple beam steering cells 311, the bandwidth size could not be dynamically defined.

In the present embodiment, adjustments to attenuation are made with the actuatable beam diffraction device 310. By way of example and not by way of limitation, an array of liquid crystal polarization gratings (LCPGs) may be used for the actuatable beam diffraction device element 310. LCPGs are described in "Wide-angle, nonmechanical beam steering using thin liquid crystal polarization gratings" Kim J. et al., *Advanced Wavefront Control Methods, Devices, and Applications VI*., Proc. of SPIE Vol. 7093, 7093-02 (2008) which is incorporated herein in its entirety.

The structure of LCPG is comprised of an in-plane, uniaxial birefringence that varies with position (i.e., n(x)=[sin (πx/Λ), cos(πx/Λ), 0]), where Λ is the grating period. This structure is created by interfering two orthogonally circularly-polarized ultraviolet laser beams recorded within a polarization-sensitive photo-alignment material. The ideal diffraction efficiency of the LCPG at normal incidence can be derived with Jones calculus as follows:

$$\eta_0 = \cos^2\left(\frac{\pi \Delta n d}{\lambda}\right) \quad \text{Eq. 1}$$

$$\eta_{\pm 1} = \frac{1 \mp S_3'}{2}\sin^2\left(\frac{\pi \Delta n d}{\lambda}\right) \quad \text{Eq. 2}$$

where $\eta_m$ is the diffraction efficiency of the m diffraction order, $\Delta n$ is the birefringence of liquid crystal, d is the thickness of the cell, $\lambda$ is the wavelength of incident light, and $S_3'=S_3/S_0$ is the normalized Stokes parameter corresponding to ellipticity of the incident polarization.

Equations 1 and 2 can be used to derive several properties of LCPG. First, if the thickness is chosen as $d=\lambda/2\Delta n$ (half-wave retardation of the LC layer), zero-order transmission will be zero ($\eta_0=0$) and all of light will deflect to the first orders ($\Sigma \eta_{\pm 1}=1$). Moreover, the first orders are highly sensitive with respect to the $S_3'$ parameter, while the zero-order is polarization independent. Therefore, when the incident light is right hand circularly polarized, $S_3'=-1$, then diffraction efficiency for diffraction orders m=+1 and m=-1 will be $\eta_{+1}=1$ and $\eta_{-1}=0$, respectively. This means all of the light passing through the LCPG is diffracted into the positive first order. In the opposite case, if the light is left handed circular polarization, $S_3'=+1$, all of the light is diffracted into the negative first order ($\eta_{+1}=0$ and $\eta_{-1}=1$). In embodiments of the present invention this mechanism may be used to deflect the spectral channels 301$_A$, 301$_B$, 301$_C$ for attenuation.

The diffraction angles created by the LCPG are determined by the well-known grating equation, since the LCPG is merely a birefringent grating:

$$\sin\theta_m = \left(m\frac{\lambda}{\Lambda}\right) + \sin\theta_{in} \quad \text{Eq. 3}$$

where $\theta_{in}$ is the incident angle, $\theta_m$ is the angle of diffraction of transmitted light, and m={-1, 0, +1} is the diffraction order. For example, a 1550 nm wavelength light needs an 8.93 μm grating period to perform θ=10° diffraction angle, when $\theta_{in}=0°$. For the non-diffracting case (zero-order), an applied voltage much greater than a voltage threshold will reorient the LC director out of the plane and reduce the effective birefringence toward zero ($\Delta n \rightarrow 0$). By effectively erasing the grating of LCPG, incident light can pass directly through the PG without any change of polarization state. Therefore, the attenuation of the spectral channels 301$_A$, 301$_B$, or 301$_C$ can be activated and deactivated when needed. It is noted that the diffraction angle depends on the grating period. Consequently, the foregoing example should not be seen as limiting. Alternative examples include 7.46 μm grating period to perform θ=12° diffraction angle, when $\theta_{in}=0°$ or 11.1 μm grating period to perform θ=8° diffraction angle, when $\theta_{in}=0°$.

FIG. 3C provides further illustration of how the LCPG-VOA functions. The unpolarized spectral channel 301$_A$ enters the LCPG-VOA 310. When activated, the LCPG-VOA 310 polarizes spectral channel 301$_A$ into left hand circular polarization 301$_{A-L}$ and right hand circular polarization 301$_{A-R}$. Since the first orders (m=1) are sensitive to right hand and left hand polarization, the polarized spectral channels 301$_{A-L}$ and 301$_{A-R}$ are deflected at an angle via diffraction before they reach the beam steering element 309. If an even larger deflection angle is required, the polarized spectral channels 301$_{A-L}$ and 301$_{A-R}$ may pass through the LCPG-VOA 310 a second time after being deflected by the beam steering element 309.

It is desirable to take into account the behavior of circularly polarized light in cases where the beam steering element 309 is a reflective element, such as a beam steering mirror. When circularly polarized light is reflected by a mirror, the polarization of the light changes from left-hand circular to right-hand circular or vice versa. If the reflected light passes back through the LCPG-VOA 310 without changing the handedness back, the LCPG will undo the angle change done by the $1^{st}$ pass and the beam will return back to the system with unchanged direction.

This problem can be addressed by inserting a quarter waveplate (QWP) 308 between LCPG-VOA 310 and the beam steering element 309. A QWP introduces a 45-degree phase delay between two linear polarizations. A QWP can rotate linearly polarized light into circularly polarized light and vice versa.

When right-hand circularly polarized (RCP) light passes through the QWP 308, it becomes linearly polarized at a 45-degree with respect to the principle axis of the QWP linear polarized light. The linear polarized light retains its linear polarization when reflected by the beam steering element 309. However, because the change of propagation direction upon reflection, this 45-degree linear polarized light become −45-degree linear polarized light. When the −45-degree linear polarized light passes through the QWP 308 a second time, it is converted into RCP light.

The switching system described in present disclosure differs from prior optical switching systems in that the spectral channels $301_A$, $301_B$, $301_C$ are not each split into two parallel beams that must pass through the entire system. This eliminates the need for addition components such as splitters, combiners and polarization rotators. The present invention allows the spectral channels $301_A$, $301_B$, $301_C$ to remain a single beam until the actuatable beam diffraction device 310 splits some portion of the beam into sub-beams of the two polarization components $301_{n-L}$ and $301_{n-R}$ which are discarded.

FIG. 3D depicts how the spectral channel $301_C$ may be blanked during switching. By way of example and not by way of limitation, suppose that the WSS 300 is initially configured to receive the multiplexed signal 301 at port 302 and couple spectral channel $301_C$ to port $302_C$, while the other channels are coupled to port $302_B$. Later it is desired to couple spectral channel $301_C$ to port $302_A$. This is done by rotating beam steering cell $311_C$ about its switching axis. However, if this were done without attenuation, channel $301_C$ would be briefly coupled to port $302_B$. To avoid this, a corresponding diffraction cell $312_C$ may be activated in order to steer the spectral channel around port $302_B$, e.g., as shown by the path indicated by the arrows in FIG. 3D. The diffraction cell $312_C$ deflects the $301_{C-L}$ component (in the X-direction) to the left of the column of I/O ports the $301_{C-R}$ component to right of the column of I/O ports. Once the beam steering cell $311_C$ has deflected the two components $301_{C-L}$ and $301_{C-R}$ (in the Y-direction) past the $302_B$ port, the diffraction cell $312_C$ can be deactivated and the two components $301_{C-L}$ and $301_{C-R}$ allowed to recombine into $301_C$ and, which is coupled to the $302_A$.

FIGS. 3E and 3F depict an embodiment of the attenuation process from two different perspectives (the wavelength separator is omitted in both figures for clarity). FIG. 3E is a view in the X-Z plane and demonstrates how the polarization independent diffraction cell $312_C$ splits the optical channel $301_C$ into two components $301_{C-L}$ and $301_{C-R}$ in the X-direction. Since the output ports $302_A$, $302_B$, $302_C$ are arranged in a column with input port 302 along the Y-axis, the two components $301_{C-L}$ and $301_{C-R}$ do not become coupled to another port. The view from this plane allows the viewer to perceive the multiple diffraction cells $312_A$, $312_B$, $312_C$. By way of example and not by way of limitation, FIG. 3E depicts the diffraction cells $312_A$, $312_B$, $312_C$ to be in a one-to-one ratio with the beam steering cells $311_A$, $311_B$, $311_C$. In other embodiments the ratio of the diffraction cells 312 with respect to the beam steering cells 311 may be increased in order to provide selective diffraction of the sub-channels of the optical channels $301_A$, $301_B$, and $301_C$.

FIG. 3F is a view in the Y-Z plane and demonstrates how a primary beam steering cell $311_C$ is capable of switching the spectral channel $301_C$ from one output port to another output port. Rotation of beam steering cell $311_C$ about the X-axis changes the angle of deflection of the optical channel $301_C$ and allows the port to be switched. When diffraction cell $312_C$ is not activated, the ray tracing of the optical channel $301_C$ would continue on to on through the attenuation cell $312_C$. However, when the diffraction cell 312 is activated the deflection of the optical channel $301_C$ is not perceptible from this view because the two components $301_{C-L}$ and $301_{C-R}$ are deflected in the X-direction.

The principle advantage of using an LCGP as an active modulator in the attenuation element 310 is the possibility to turn Δn on and off with an electric field. However, it is also possible to use an actuatable diffraction device having a polarization grating (e.g., an LCGP) as a passive component while using another simpler modulator to serve as the active element. In the above description of FIG. 3C, a quarter wave plate (QWP) 308 was used to undo the hand-changing effect of the reflection of the mirror.

According to an alternative aspect of the present disclosure, it may be desirable to use a simple birefringent-mode liquid crystal LC array 313 between the micro-mirror array 314 and a passive polarization grating 315. The liquid crystal array 313 provides active modulation. When the voltage for a liquid crystal element corresponding to a given mirror in the array 314 is turned on, the birefringence for that element is removed. The mirror changes the handedness of the circularly polarized light and the LCGP 315 has no effect. When the voltage is removed, the LCGP 315 diffracts the light to $+-1^{st}$ order and very little amount of the light remains in the $0^{th}$ order.

Figure 3G:
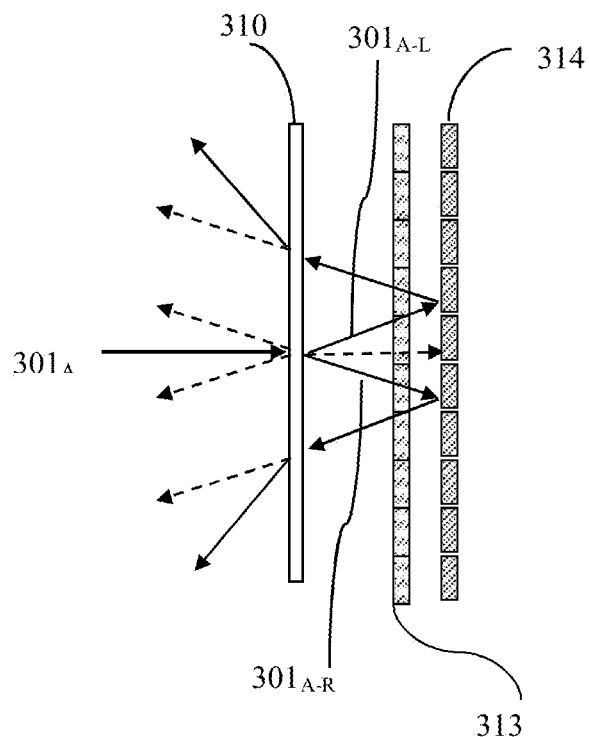
FIG. 3G is a schematic diagram depicting an alternative switching process using liquid crystal (LC) modulators according to an aspect of the present disclosure.

One of the advantages of using a birefringent liquid crystal array is for in-plane switching configurations since the electrodes for the LC elements are located on one side and not in the beam path. These electrodes can be located in the light does not see. A configuration of the type shown in FIG. 3G also offers the possibility to integrate solid state birefringence material directly onto the mirrors of the micromirror array 314 (e.g., a MEMS micromirror array).

Tilted LCPG-VOA:

It is noted that a grating diffracts incident light to different diffraction angle. However, in order to achieve high wavelength resoution, it is typically desirable to let the incident light cover as many grating grooves as possible. The wavelength resolution is typically given by:

$$\Delta\lambda = \frac{\lambda}{N}, \text{ where } N \text{ is the number of grooves.}$$

where N is the number of grooves.

This also means the angle spread of the diffraction beam is given by:

$$\Delta\theta \approx \frac{\theta}{N}, \text{ where } N \text{ is the number of groove.}$$

where N is the number of groove.

In wavelength selective switch (WSS) optics, the beam waist ($w_x$) along the wavelength dispersing direction (x-axis In FIG. 3A) is much smaller than that in the other direction. Typically, $w_x$ is in the order of 30 μm while $w_y$ is in the order to 300 μm.

With a grating period in the order of 8 μm, N is about 4 which is really too few to form a strong constructive interference between the light diffracted from different grooves. Therefore, the extinction back to $0^{th}$ order may not be acceptable.

Figure 3H:
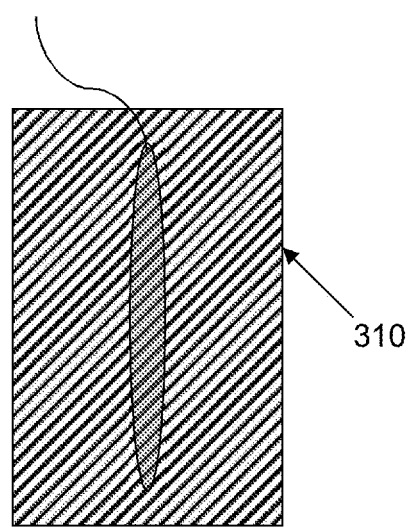
FIG. 3H is a schematic diagram depicting a Liquid Crystal Polarization Grating (LCPG) element having a titled grating orientation according to an aspect of the present disclosure.

If a high extinction ratio is desirable, one can rotate the orientation of the grating by some non-zero angle relative to the x-axis, e.g., 45 degrees as shown in FIG. 3H. In this case, an LCGP 310 diffracts the light along a 45 degree angle. By way of example, and not by way of limitation, if the grating period of the LCPG 310 is 8 μm, the $1^{st}$ order angle is about 11.17 degree. Double passing light through such an LCPG 310 would give a scattered angle of 22.34 degrees which is far more than needed to obtain an acceptable extinction ratio.

By utilizing an LCGP with a grating orientation rotated by a sizable angle, the number of the groove increases dramatically, it is possible to achieve very high extinction ratio. Clearly, the LCGP grating orientation does not need to be exactly at 45 degrees. In real cases, even 90 degree rotation can work well.

Figure 4A:
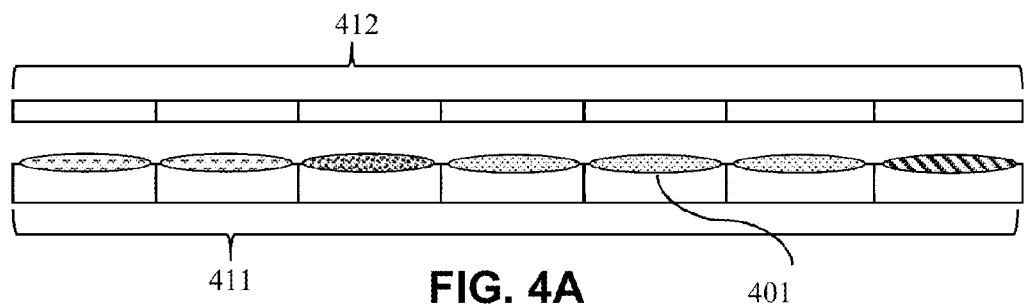
FIG. 4A-4B are depictions of the beam steering elements and actuatable beam diffraction devices according to different embodiments of the present invention.

According to one embodiment of the present invention, there is one attenuation cell 412 corresponding to each beam steering cell 411. FIG. 4A depicts the one-to-one ratio of the beam steering cells 411 to the diffraction cells 412. It should be noted that the bandwidth or wavelength range of each channel $401_n$ is not limited to the width of a single beam steering cell 411. By way of example and not by way of limitation, FIG. 4A demonstrates that a channel $401_n$ can cover one, two, or three cells.

Figure 4B:
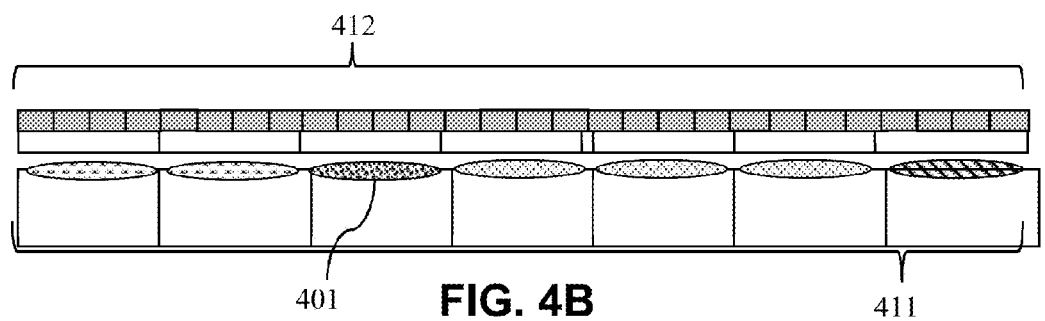

FIG. 4B is a depiction of the present invention according to another embodiment. This embodiment utilizes a configuration of the polarization insensitive attenuation element 410 where diffraction cells 412 are a fraction of the size of the beam steering cells 411. This allows the diffraction cells 412 to further divide the spectral channel $401_n$ into sub-channels. The ability to create sub-channels provides the capability to dynamically shape the overall attenuation curve 415 for an optical channel. This allows for effective channel equalization for narrow bands of wavelengths within an optical channel $401_n$.

Figure 4C:
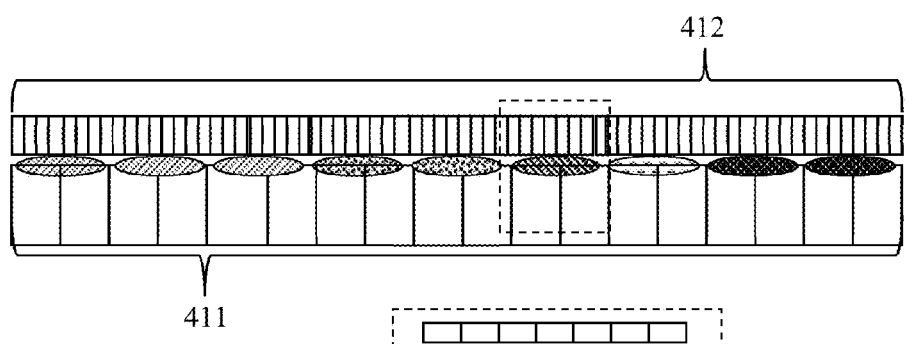
FIG. 4C is a depiction of the beam shaping possible with an embodiment of the present invention.

FIG. 4C provides a zoomed in view of channel $401_n$ in addition to the beam steering cells 411 and the diffraction cells 412. Below the zoomed in view is the overall attenuation curve 415 for the channel. FIG. 4C displays how the diffraction cells 412 can effectively accomplishing channel equalization for narrow bands of wavelengths within the spectral channel $401_n$. By way of example and not by way of limitation, the width of each of the beam steering cells 411 may be sized to accommodate a bandwidth portion of 25 GHz and the width of each of the diffraction cells 412 may be selected to accommodate 6.25 GHz sub-channels of the 25 GHz bandwidth portion. Therefore, in the example illustrated in FIG. 4C, four diffraction cells 412 are optically coupled to each beam steering cell 411. The attenuation curve 415 is positioned in line with channel 401. Each column of boxes on the Frequency axis corresponds to the diffraction cell 412 directly above the curve 415. As such, each box represents a 6.25 GHz sub-portion of the channel 401 that is 50 GHz wide overall. The resulting channel equalizer function provides optical super channels that can be dynamically combined in increments of 25 GHz with optical channel equalization capabilities in 6.25 GHz sub-bands across each optical super channel. The attenuation curve 415 of the channel 401 may be selectively shaped by selective attenuation of the 6.25 GHz sub-portions by their corresponding diffraction cells 412.

Figure 5:
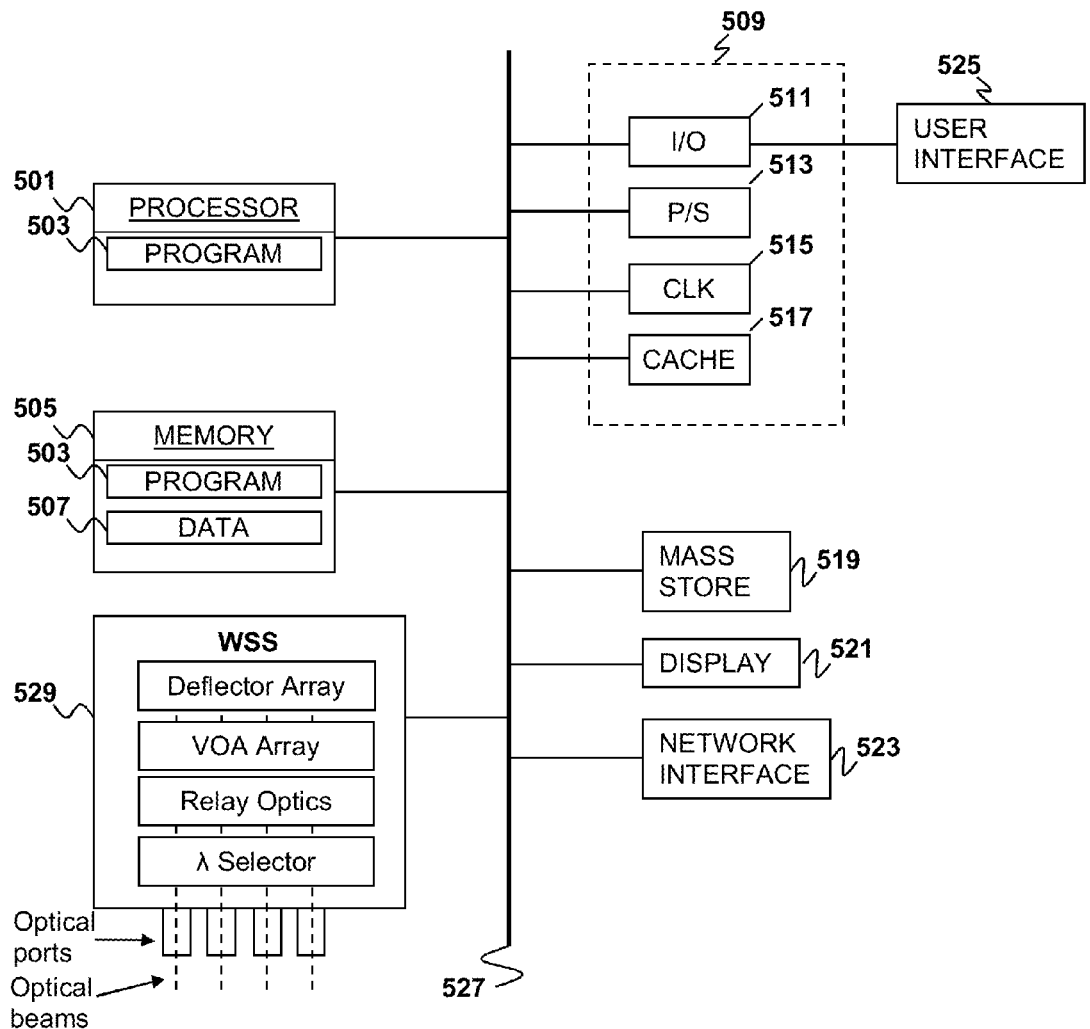
FIG. 5 is a block diagram illustrating an apparatus for optical switching according to an embodiment of the present invention.

FIG. 5 is a block diagram of the present invention according to one embodiment. The WSS device 529 includes the beam steering elements, the polarization independent attenuation elements, the relay optics, the wavelength separator and the optical I/O ports. The WSS device 529 may exchange signals with other components via an internal system bus 527. Also connected to the system bus may be a central processor unit (CPU) 501. The CPU 501 may execute a channel switching program 503, portions of which may be stored in the memory 505 (e.g., RAM, DRAM, ROM, and the like). The memory 505 may contain data 507 related to the channel switching occurring in the WSS 529. The system bus 527 may also be connected to well-known support circuits 509, such as input/output (I/O) circuits 511, power supplies (P/S) 513, a clock (CLK) 515 and cache 517. The I/O circuits 511 may optionally be connected to a user interface 525. The user interface 525 may include a keyboard, mouse, joystick, light pen or other device. Additionally, the data bus 527 may optionally allow communication with a mass storage device 519 such as a disk drive, CD-ROM drive, tape drive, or the like to store programs and/or data. The system bus 527 may also optionally allow communication with a display unit 521 to facilitate interaction between the system 500 and a user. The display unit 521 may be in the form of a cathode ray tube (CRT) or flat panel screen that displays text, numerals, graphical symbols, or images. Additionally, a network interface 523 may be able to communicate through system bus 527 as well. The components in system 500 may be part of a general purpose computer that becomes a special purpose computer when running code that implements embodiments of the present invention as described herein.

Figure 6:
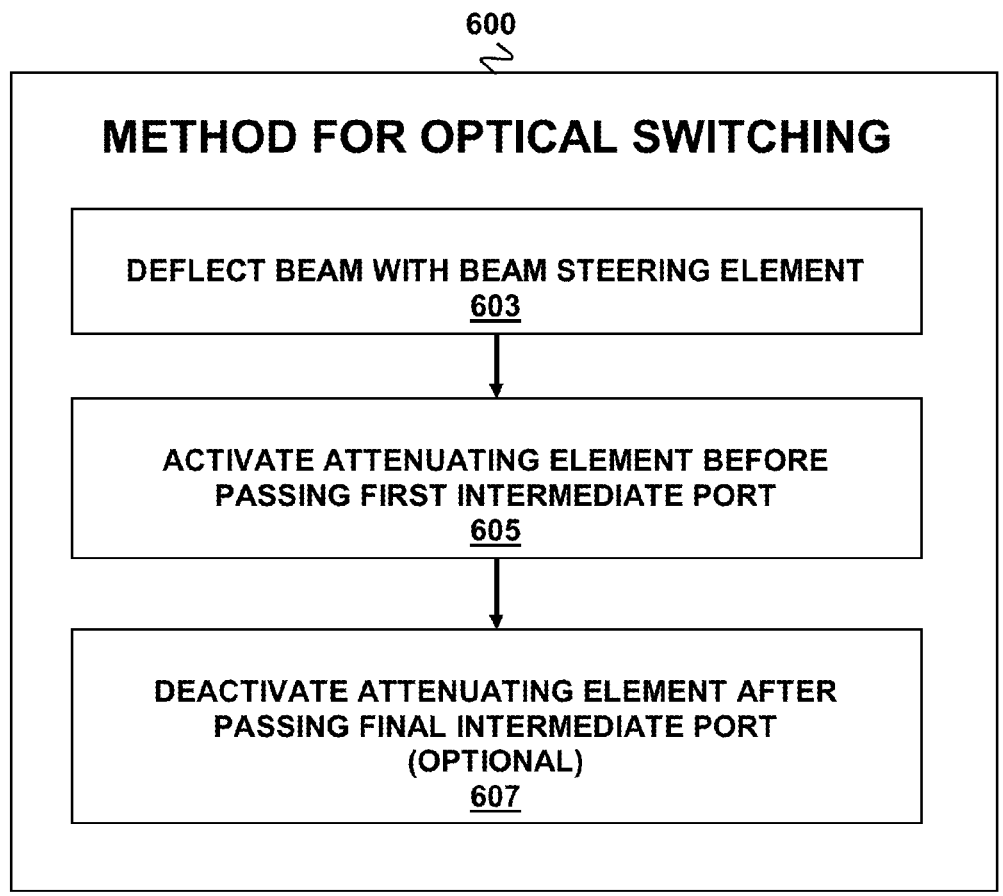
FIG. 6 is a flow diagram illustrating a method for optical switching according to an embodiment of the present invention.

By way of example, the channel switching program 503 may include instructions for implementing method 600 for switching a channel from a first port in the column of I/O ports 302, $302_A$, $302_B$, and $302_C$ to a second port in the column of I/O ports 302, $302_A$, $302_B$, and $302_C$. According to method 600 shown in FIG. 6 a channel $301_n$ may be switched by deflecting the beam about an axis of rotation with a beam steering element 309, as indicated at 603. As the channel is deflected along the column of I/O ports 302, $302_A$, $302_B$, and $302_C$ the polarization independent attenuation element 310 may be activated when the channel begins crossing over any intermediate ports $302_n$, as indicated at 605. The activated independent attenuation element 309 splits the channel $302_n$ into two components $302_{n-L}$ and $302_{n-R}$ and deflecting the two components away from the column of I/O ports 302, $302_A$, $302_B$, and $302_C$. Once the beam steering element 309 has deflected the channel components $302_{n-L}$ and $302_{n-R}$ past all intermediate ports $302_n$ the attenuation element 310 may optically be deactivated as indicated at 607 and the channel components $302_{n-L}$ and $302_{n-R}$ deflect back in line with the column of I/O ports 302, $302_A$, $302_B$, and $302_C$ and recombine into channel $302_n$. Channel $302_n$ can then be coupled with the second port.

Figure 7:
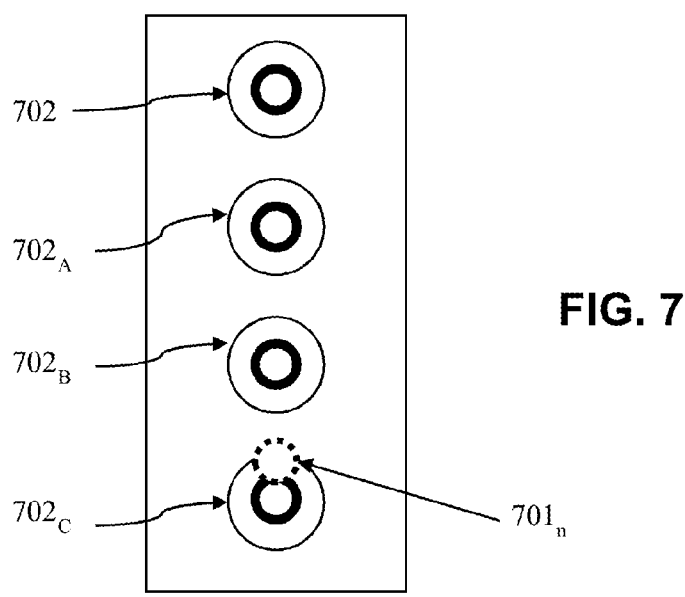
FIG. 7 is a schematic diagram of an additional embodiment in which rotation of a beam steering element can produce attenuation of a channel.

FIG. 7 describes an additional embodiment of the present invention. In this embodiment, the rotation of the beam steering element 709 can produce attenuation of the channel $701_n$ as is appropriate for a WSS by deflecting the beam along a column of optical I/O ports 702, 702$_A$, 702$_B$, and 702$_C$ such that it is slightly misaligned from a peak coupling position. In this embodiment, the polarization independent attenuation element could be used for blanking the beam during port switching operations or for optical channel shaping, e.g., as described above with respect to FIGS. 4B-4C.

While the above is a complete description of the preferred embodiment of the present invention, it is possible to use various alternatives, modifications, and equivalents. Therefore, the scope of the present invention should be determined not with reference to the above description, but should, instead be determined with reference to the appended claims, along with their full scope of equivalents. Any feature described herein, whether preferred or not, may be combined with any other feature described herein, whether preferred or not. In the claims that follow, the indefinite article "A" or "An" refers to a quantity of one or more of the item following the article, except where expressly stated otherwise. The appended claims are not interpreted as including means-plus-function limitations, unless such a limitation is explicitly received in a given claim using the phrase "means for".

What is claimed is:

1. An optical switching apparatus, comprising:
   one or more beam steering elements, configured to deflect an optical beam along a column of input/output (I/O) ports by deflecting the beam about a single axis, such that the optical beam can be selectively coupled from a first port to a second port; and
   one or more actuatable beam diffraction devices optically coupled to the one or more beam steering elements, wherein each of the one or more actuatable beam diffraction devices is actuatable between a non-diffracting state and a diffracting state, wherein each of the one or more actuatable beam diffraction devices is configured to deflect the optical beam when in the diffracting state such that at least a portion of the optical beam is diffracted outside a detection area of the column of I/O ports.

2. The apparatus of claim 1, wherein the beam steering element is an array of independently controlled beam steering cells.

3. The apparatus of claim 2, wherein two or more adjacent beam steering cells are configured to deflect corresponding sub-channels of the optical beam in unison.

4. The apparatus of claim 2, wherein the one or more actuatable beam diffraction devices is an array of independently controlled diffraction cells, each diffraction cell being optically coupled to a designated beam steering cell.

5. The apparatus of claim 4, wherein there are two or more diffraction cells optically coupled to each beam steering cell, such that each diffraction cell is independently controlled to diffract a designated portion of the optical beam outside the detection area of the column of I/O ports.

6. The apparatus of claim 4, wherein each diffraction cell includes a liquid crystal polarization grating.

7. The apparatus of claim 6, wherein each diffraction cell includes a birefringent liquid crystal element.

8. The apparatus of claim 1, wherein the beam steering element is a micromechanical system (MEMS) mirror.

9. The apparatus of claim 1, wherein the beam steering element is composed of lead lanthanum zirconate titanate (PLZT).

10. The apparatus of claim 1, wherein the one or more actuatable beam diffraction devices includes a liquid crystal polarization grating (LCPG).

11. The apparatus of claim 10, wherein the LCPG is characterized by a grating orientation that is orientated at any angle with respect to a switching axis of the one or more beam steering elements.

12. The apparatus of claim 1, further comprising a wavelength separator located in the optical path between the column of I/O ports and the one or more beam steering elements.

13. A method of optical switching, comprising:
   a) deflecting an optical beam about a single axis with a beam steering element such that an optical beam is deflected along a column of input/output (I/O) ports from a first port to a second port; and
   b) optically attenuating a coupling of the optical beam to the second port by deflecting at least a portion of the optical beam away from the column of I/O ports with an actuatable beam diffraction device.

14. The method of claim 13, wherein the beam steering element includes an array of independently controlled beam steering cells.

15. The method of claim 14, wherein two or more adjacent beam steering cells are uniformly controlled to deflect the optical beam.

16. The method of claim 14, wherein the actuatable beam diffraction device is an array of independently controlled diffraction cells, each diffraction cell in the array being optically coupled to a designated beam steering cell.

17. The method of claim 16, wherein there are two or more diffraction cells optically coupled to each beam steering cell, such that each diffraction cell is independently controlled to deflect a unique portion of the channel away from the column of I/O ports.

18. The method of claim 16, wherein each diffraction cell includes a liquid crystal polarization grating.

19. The method of claim 18, wherein each diffraction cell includes a birefringent liquid crystal element.

20. The method of claim 13, wherein the beam steering element is a micromechanical (MEMS) mirror.

21. The method of claim 13, wherein the beam steering element is composed of lead lanthanum zirconate titanate (PLZT).

22. The method of claim 13, wherein the actuatable beam diffraction device is a liquid crystal polarization grating (LCPG).

23. The method of claim 22, wherein the LCPG is characterized by a grating orientation that is orientated at any angle with respect to a switching axis of the one or more beam steering elements.

24. The method of claim 13, further comprising, separating the optical beam into channels with a wavelength separator.

25. The method of claim 13, further comprising, creating additional attenuation by deflecting the optical beam with the beam steering element such that it is slightly misaligned from a peak coupling position but still along a centerline of the column of I/O ports.

26. A non-transitory computer readable medium containing program instructions for optical switching, wherein execution of the program instructions by one or more processors of a computer system causes the one or more processors to carry out the steps of:
   a) deflecting an optical beam about a single axis with a beam steering element such that an optical beam is deflected along a column of input/output (I/O) ports from a first port to a second port; and
   b) optically attenuating a coupling of the optical beam to the second port by deflecting at least a portion of the optical beam away from the column of I/O ports with an actuatable beam diffraction device.

* * * * *